United States Patent [19]
Biggs

[11] Patent Number: 5,540,521
[45] Date of Patent: Jul. 30, 1996

[54] INFLATABLE CUSHION FOR CULTURING AND MOVEMENT OF AQUATIC ORGANISMS

[76] Inventor: Robert W. Biggs, 1022 W. 9th Ave., Spokane, Wash. 99204

[21] Appl. No.: 294,060

[22] Filed: Aug. 25, 1994

[51] Int. Cl.⁶ ........................................... B65G 65/30
[52] U.S. Cl. ........................... 405/59; 405/60; 405/65; 405/68; 405/74; 405/82; 406/145; 406/146
[58] Field of Search .............................. 405/59, 60, 65, 405/68, 74, 82; 406/145, 146

[56] References Cited

U.S. PATENT DOCUMENTS

| | | | |
|---|---|---|---|
| 3,834,167 | 9/1974 | Tabor | 61/30 |
| 4,081,110 | 3/1978 | Evans | 222/203 |
| 4,160,523 | 7/1979 | Stevens | 237/2 A |
| 4,728,004 | 3/1988 | Bonerb | 222/61 |
| 4,968,008 | 11/1990 | Emmett et al. | 266/168 |
| 5,167,472 | 12/1992 | Podd et al. | 406/145 |
| 5,330,459 | 7/1994 | Lavon et al. | 604/385.1 |

*Primary Examiner*—Roger J. Schoeppel
*Attorney, Agent, or Firm*—Thomas G. Walsh

[57] ABSTRACT

An aqua culture facility and method using a pneumatic pump for displacement of water or other liquid located in a confined space having rigid bottom and side walls which form an interior surface of the space, with a flexible liner having the same contour as the space in which the liquid is confined. The confined space is a culture chamber and open at the top side, such as a fish pond. The flexible liner is comprised of two or more flexible membranes which are in sealing engagement at their edge portions to form a sealed compartment. There is an air inlet-outlet means through which gas or liquid can be introduced to inflate and then to exhaust the air from the sealed compartment. The flexible liner has a flexible membrane in contact with the rigid bottom and side walls of the confined space and is larger then the interior surface of the confined space. The placed flexible membrane liner is covered with water and seeded with organisms to create the culture chamber. To harvest the organisms, air is introduced through the air inlet-outlet means, thus forming a pillow which pumps and displaces the culture water to a drainage end for collection, treatment or relocation of the organisms.

5 Claims, 4 Drawing Sheets

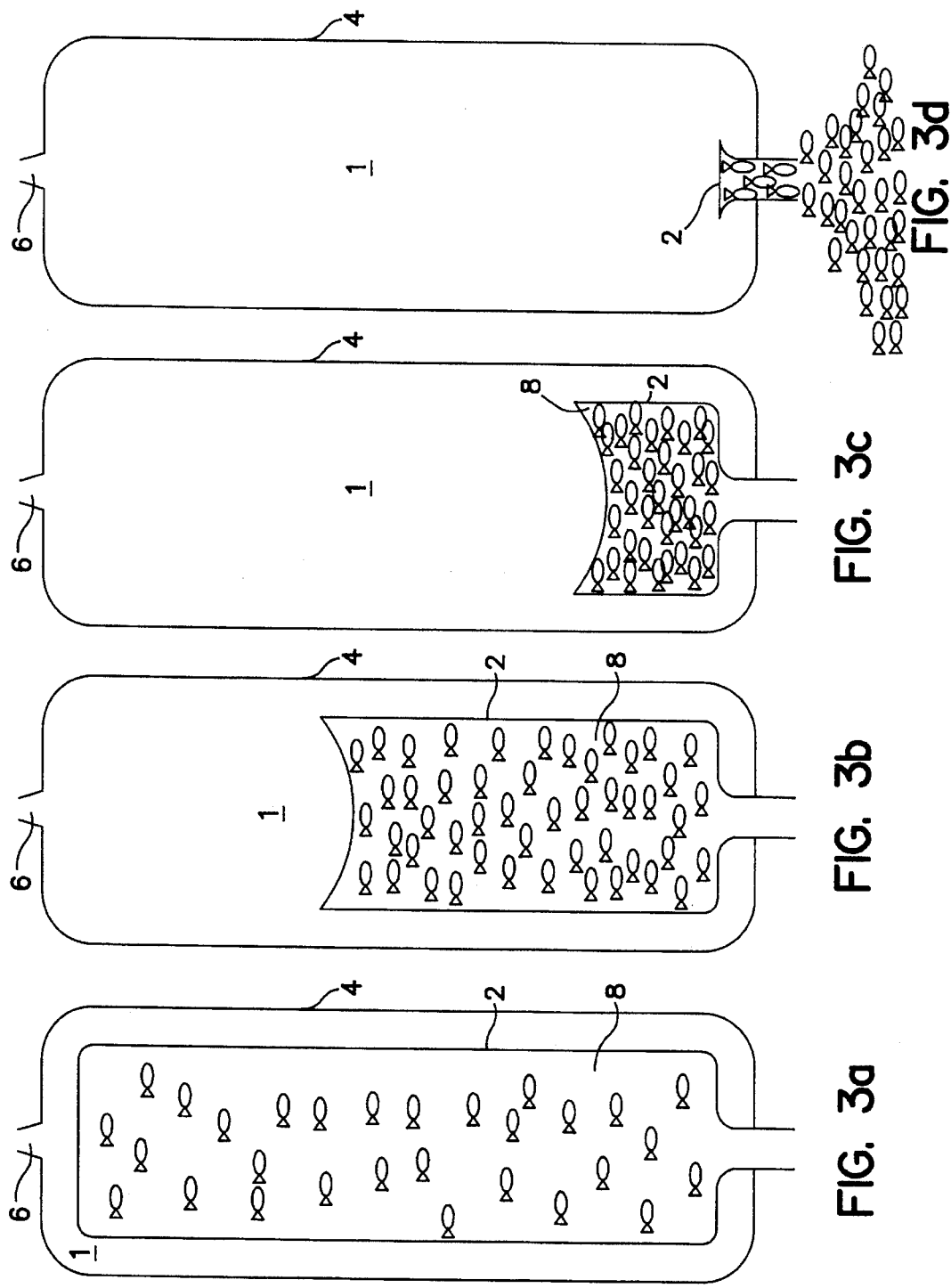

INFLATABLE CUSHION FOR CULTURING AND MOVEMENT OF AQUATIC ORGANISMS

BACKGROUND OF THE INVENTION

1. Field of the Invention

The invention relates to a method and apparatus in the field of culturing and harvesting aquatic organisms, specifically, pumps for displacing aquaculture water, when the organisms are in a confined, protected or controlled environment.

2. Description of Related Art and Information

In the culturing and harvesting of aquatic organisms such as fish, crustaceans, frogs and other aquatic life forms, a high injury and mortality rate can result to the organisms during capturing as the result of using current methods and devices. For example, seining, netting and other capturing methods can cause injury to the organisms and are inefficient techniques. When organisms are seined or netted, they can suffer extensive damage from the crushing weight of remaining fish. Multiple passes of a net can result in further injury, is costly and is all inclusive in harvesting results.

Considerable damage can also occur as fish, lobster, prawns, shrimp and other organisms are sorted from entanglement with the netting. Most injuries to the organisms occur at harvesting or during post-harvest treatment with harvesting being a tedious and time consuming job. Such delays in processing result in a deterioration of organism quality when packed for shipping. Also, many aquaculture products, from fresh water lobster to ornamental fish, must enter the market place alive.

In addition, many species must be sent to processing plants alive to prevent enzyme damage that occurs immediately following death. Frogs are particularly difficult to harvest and grade at anytime pre and post metamorphic, using present methods. The system of the present invention makes frog harvesting safe and easy.

Harvesting and fish-moving techniques, as practiced today, are costly, damaging, self limiting and allow a certain percentage of fish to escape. The art, as practiced, lacks portability, requires a great deal of time to establish in the field, does not protect aquatic organisms from predation and does not produce a controlled environment.

Frequently, fish escape the net at harvest time and then become predators the following year. To prevent this, using today's available methods, lakes, ponds or other aquaculture production units, must be drained, disked, dried and refilled. This adds a great deal of cost to the operation. If wild stocks are left to over-winter, there is a chance of genetic or disease contamination.

In addition, certain species, such as the salmon fish of the Pacific Northwest, have been placed on the endangered species list because of interruption of migratory patterns due to the construction of hydroelectric dams on, for example, the Columbia and Snake Rivers. It is impossible for adult salmon to negotiate these dams in upstream migration. The addition of fish ladders to aid the upstream migration has largely failed. On the other hand, young fry, hatched upstream above the dams, are unable to safely reach their downstream destination with thousands perishing in the effort. This results in an interruption of the salmon's natural reproductive instinct and pattern. The method of the present invention provides a safe, effective and alternative solution to fulfilling the migratory requirements of these fish and will allow these species to flourish once again. It also allows hatched fry to be safely moved downstream beyond obstructing dams.

The method and apparatus of the present invention combines layered membranes that are peripherally sealed resulting in a potential space that can be inflated with air or a fluid. As the space is inflated, it functions as a pump displacing overlying culture water in a culture chamber or other fluids in a controlled amount and direction. Layered membranes are known in the art and are used for many purposes, but none have been constructed, used or anticipated to achieve the results of the present invention. While there are many devices and methods of aquatic culturing, the art does not describe, claim or anticipate culturing, harvesting or moving aquatic organisms using a water displacement and re-cycling device and method of the present invention.

U.S. Pat. No. 5,216,976, to Marinkovich, Method and Apparatus for High-Intensity Controlled Environment Aquaculture, describes and claims a controlled environment in which a metal framework supported dome is placed over a body of water to create an enclosed eco-system by which the water can be heated by a thermal blanket lining the body of water as well as by bubbling heated air through the water. The thermal blanket is covered with a soil substrate. This invention neither claims or anticipates a layered water displacement apparatus or method of the present invention. U.S. Pat. No. 4,160,523, to Stevens, Air Structure, describes and claims a layered and compartmentalized dome that has buoyancy created by solar-heated air. It further describes a use in association with the construction of a greenhouse. It neither describes or anticipates a use integral to an aquatic culture facility in which the ground and greenhouse units are constructed as one unit and designed to maintain temperature, humidity, and water recycling in aquatic culturing and harvesting.

U.S. Pat. No. 3,834,167, to Tabor, Collapsible Dam and Damming Method, describes and claims a inflatable/collapsible envelope that is mounted across a water course for the purpose of creating a damming effect. It is not a water-containing device nor does it describe, claim or anticipate a device or method in the use of culturing or harvesting aquaculture.

SUMMARY OF THE INVENTION

The present invention is an Aquatic Culture Facility or ACF, with sealed layers of a membranous material at the edge portion to form a sealed compartment between the layers. The sealed compartment creates a potential space in which air or other fluid can be pumped. The ACF is a flexible liner for a confined space. The confined space is filled with water which covers the ACF to form a water-containing facility or culture chamber. Aquaculture organisms are then introduced into the culture chamber.

In one of the layers is an inlet means for pumping air or fluid into the sealed compartment. As air is pumped into the sealed compartment, a rolling action begins which follows the path of least resistance as it enlarges, thus displacing and concentrating organisms in the culture chamber at a drainage end. The organisms can then be harvested, treated or relocated.

BRIEF DESCRIPTION OF THE DRAWINGS

FIG. 3a is top perspective view of the ACF with the culture chamber filled before inflation.

FIG. 3b is top perspective view of the ACF about 40% inflated.

FIG. 3c is top perspective view of the ACF about 80% inflated.

FIG. 3d is top perspective view of the ACF inflated with complete displacement of the organisms to the drainage end.

DESCRIPTION OF THE PREFERRED EMBODIMENTS

The present invention is an Aquatic Culture Facility or ACF, that is constructed by fusing anywhere from two to multiple layers of a flexible membranous polymer material, generally at the edge portions of the material, to form a flexible liner with a sealed compartment between the membranous layers. The sealed compartment contains an inlet-outlet means for pumping and exhausting gas or fluid into and from the sealed compartment. The edge portions of the sealed compartment are welded to form a seam by one of several welding methods known in the art, such as with a hot wedge welder or an extrusion welder. Glues are also used for specific sealing indications.

The ACF liner is used to mold the bottom and side walls of ponds and other confined water-holding areas or containers. Once the ACF liner is in place, the facility is covered with water to form a culture chamber in a confined space and then seeded with aquatic organisms. The sealed compartment creates a potential space in which air or fluid can be pumped through the inlet-outlet means. The pumped-in air acts as a pump to displace overlying culture chamber water and organisms as the sealed compartment is filled.

Examples of membranous polymer materials applicable to the present invention are "AQUA-WEVE", a reinforced polyolefin fabric manufactured by YUNKER PLASTICS, INC.; and "PERMALON", a multilayered alloyed high-density polyethylene membrane manufactured by REEF INDUSTRIES, INC.

The ACF system is anchored at its edges by either an anchor trench, weighted sand bags or through a reinforced hem and grommets that can be installed around the liner perimeter. In the alternative, the ACF can be placed in an above-ground container for the same purpose and is also applicable to any existing body of water.

The inlet-outlet means for pumping and exhausting air or fluid into the sealed compartment is located in one of the layers that forms the sealed compartment. Air is pumped into the inlet means when it is desired to harvest, treat or relocate the organisms. As air is pumped into the sealed compartment, a rolling action begins, creating a "pillow" which, as it enlarges, follows the path of least resistance, displacing the water in the culture chamber to a drainage end.

The excess water forms a spillage that can be screened for organisms, and then either re-cycled or dispersed. During the inflation or harvest cycle, as an option, the culture water can be pumped behind the harvest membrane and recycled in the system back into the culture chamber, covering the ACF liner.

In order to better control the aquatic environment and conserve water, an enclosed canopy or dome can be added as part of the initial apparatus. The dome is comprised of additional layers above the pond for temperature and humidity control as well as to prevent predation while controlling access.

Figure 1:
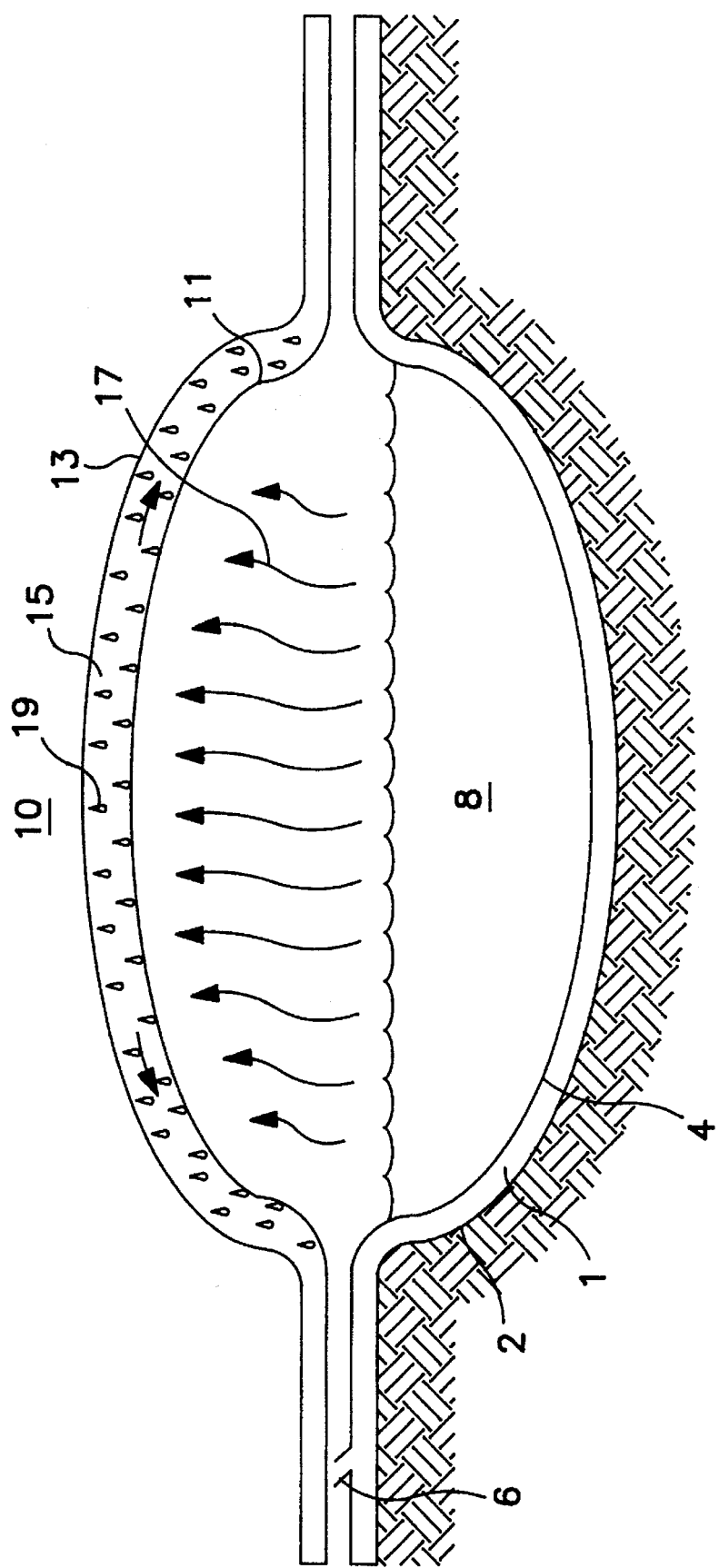
FIG. 1 is a side perspective view of an aquatic culture facility with a greenhouse dome.

In a first embodiment, referring to FIG. 1 of the ACF, a GEO layer 2 is a dense ground layer comprised of a thick membrane designed to withstand the pressure of water forces against the earth or container. All other layers are in sealing engagement at their edge portions with GEO layer 2. A harvest layer 4 is a lighter weight material designed to withstand the pressures of inflation. Harvest layer 4 is in a sealing engagement with the edge portion of GEO layer 2, forming a sealed compartment 1 that is a potential space for air or fluid. Inlet-outlet means 6 is located at an end opposite from which the culture chamber is to be drained.

An enclosed canopy or dome 10 may be added to the ACF. Dome 10 is made up of two layers and is supported by a greater internal air pressure. In FIG. 1 an evaporative or EVO layer 11 is comprised of a flexible semi-permeable evaporative membrane made of a lite material that is in sealing engagement at its edge portion to the edge portions of the GEO layer 2 and harvest layer 4. The function of EVO layer 11 is to act in cooperation with the other layers as an area for solar distillation. Greenhouse layer 13 is also fused to the GEO and harvest layers. Greenhouse layer 13 has multiple functions depending upon the environment in which the ACF is placed.

Changing the color of greenhouse layer 13 can contribute to controlling water temperature and can prevent high temperature evaporative loses that exist in arid areas. The greenhouse layer is the protective layer against bird predation, a major loss of stock. Dome 10 keeps out rodents, snakes and other animals and is a deterrent to unwanted human entry.

As the evaporative process occurs, air moisture 17 permeates EVO layer 11 forming a condensation flow 19 which is composed of fresh water and allowed to run down the sides of the membranes and into inter-membrane space 15 where it can be collected, resulting in a continuous source of fresh water. This water can be used for drinking or re-cycled into culture chamber 8. The evaporative feature of this embodiment has an added advantage when the ACF is used in salt water as it becomes a continuous supply of fresh water. The amount of water available is based on a formula which uses the amount of condensation per square foot per day collected in inter-membrane space 15.

A peripheral roll can be designed into the ACF when the site is an existing body of water. The peripheral roll is inflated to allow for flotation in the body of water. A series of peripheral rolls designed as small pillow-like areas limit the danger of destruction or sinking in water in the event that air ballast is lost. In calm waters, the ballast area can be minimal.

In a water application, the ACF is floated into position. Culture water is then placed into the culture chamber area and seeded with aquaculture. The organisms are allowed to follow their natural life cycles. When the desired size is reached, they are harvested using the unique design features and harvesting method of the ACF.

For use on land areas, the ACF is manufactured for ease of installation by forming it into a roll. The inlet-outlet means is attached to an air inflation means, such as a shop vacuum, blower, or an automobile exhaust driven pump. Air is pumped into sealed compartment 1 and the ACF easily maneuvered into position. As culture water is added to the culture chamber, covering the in-place flexible liners of the ACF, air that had been pumped into the sealed compartment is exhausted by the weight of the water added. There is no need for ballast as the weight of the filled culture chamber holds the ACF liner in place. Water may be added in the sealed compartment for additional weight on the bottom side of GEO layer 2. This unique system reduces site preparation to a simple excavation or merely smoothing of an already concave or hollowed area.

Figure 2A:
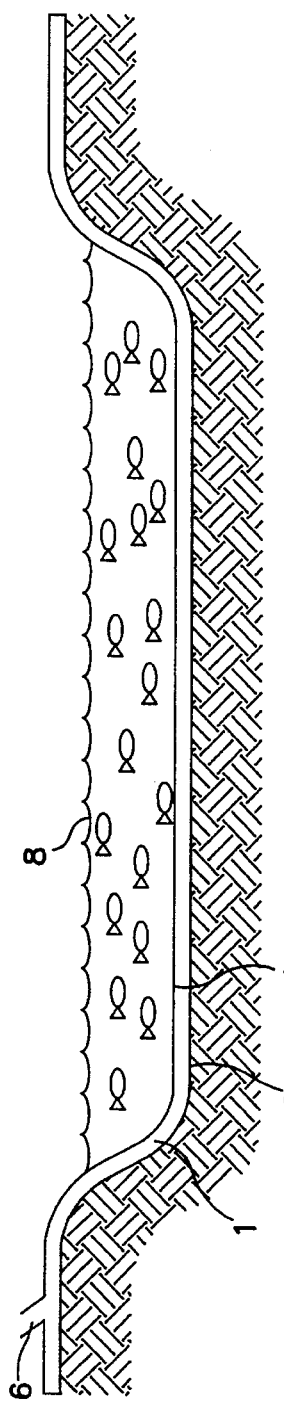
FIG. 2a is a side perspective view of the ACF in a passive mode with the culture chamber filled.
Figure 2B:
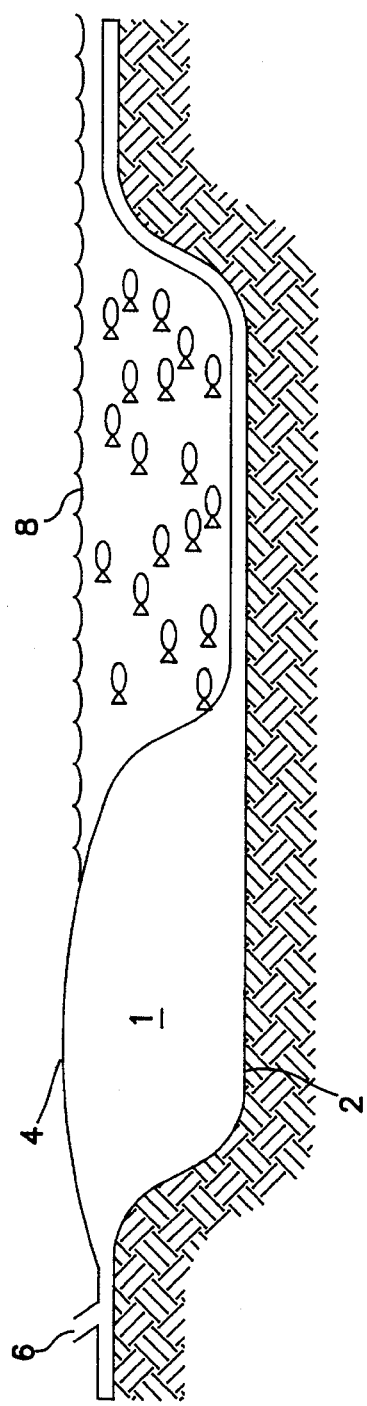
FIG. 2b is a side perspective view of the ACF about 50% inflated.
Figure 2C:
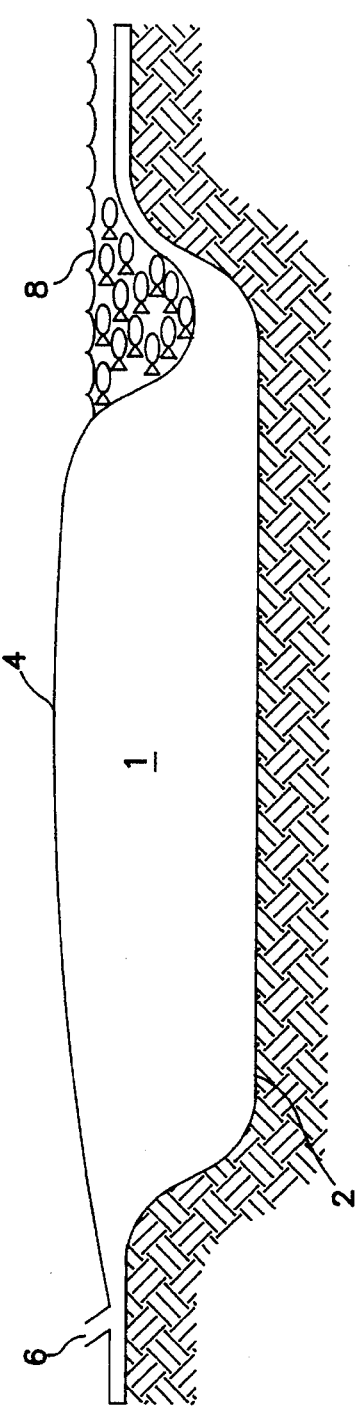
FIG. 2c is a side perspective view of the ACF about 90% inflated.
Figure 4A:
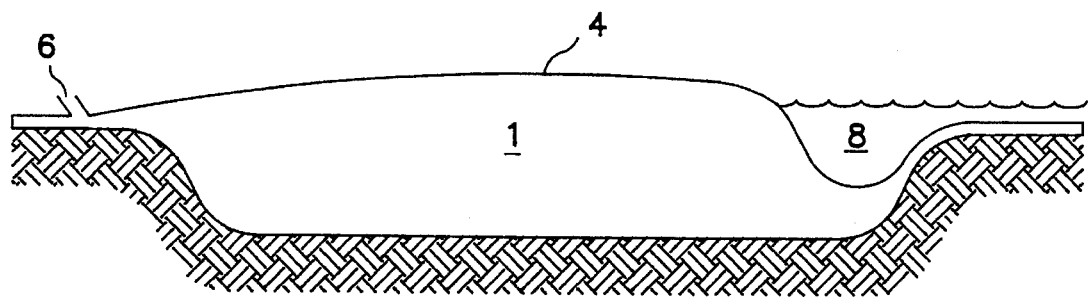
FIGS. 4a–e are side perspective views of the ACF with gradual filling of the culture chamber.
Figure 4B:
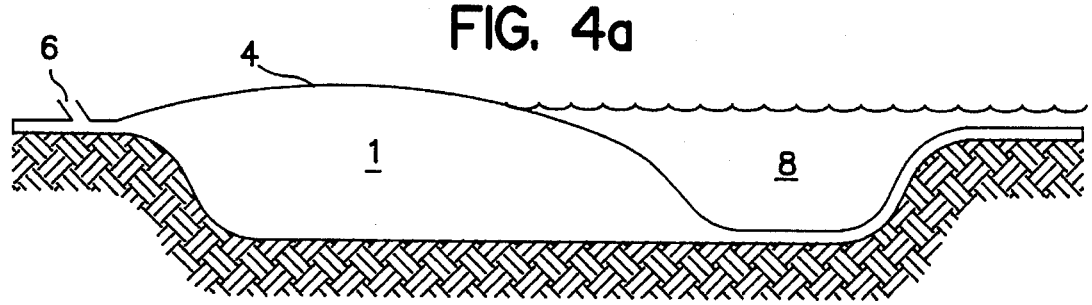
Figure 4C:
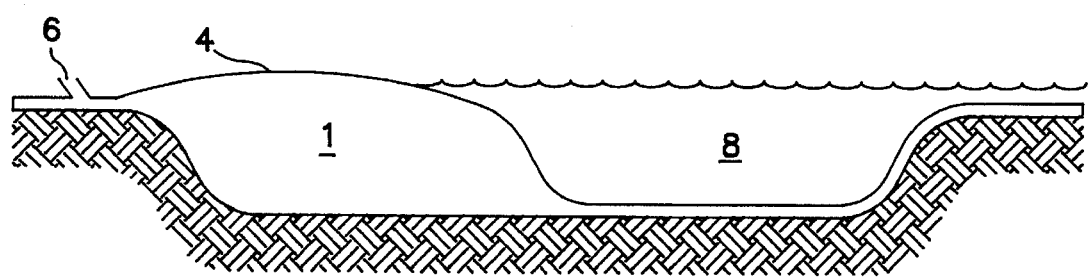
Figure 4D:
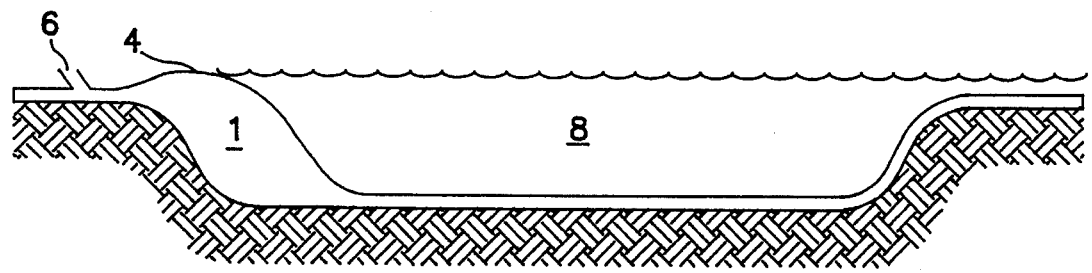
Figure 4E:
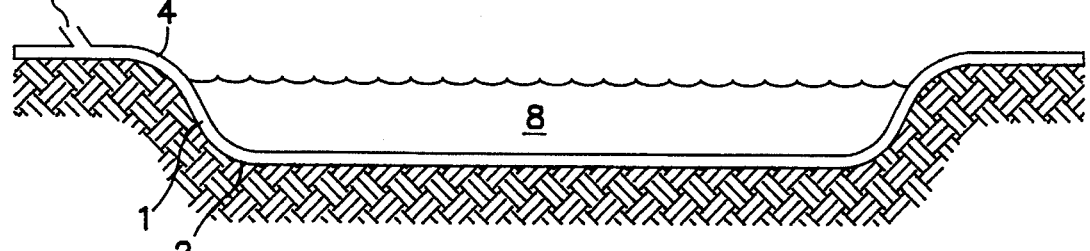

During the harvesting or inflation cycle, air or fluid is pumped into inlet/outlet means 6 shown in FIG. 1. FIG. 2a is a side view of the ACF in a passive mode. FIGS. 2b and 2c illustrate gradual inflation of sealed compartment 1 between GEO layer 2 and harvest layer 4. Harvest layer 4 is the culture chamber floor which is gradually raised above the side walls of the ACF during the inflation cycle. Inflating sealed compartment 1 results in a gentle displacement of overlying culture water and organisms towards the drainage end of the chamber. The pumped air or fluid creates a pillow out of the sealed compartment 1 which gently expands its way under the culture chamber floor of the ACF displacing the overlying culture water to the drainage end. A vertical containment membrane (VCM) can be added and acts to restrict the vertical and lateral forces generated during the harvesting cycle.

Another optional membrane or layer is a floating polyfelt filter mat which acts as an aquaculture filtering device.

The drainage end of the ACF can be placed to allow expelled culture water to pass over any type of collecting device, including an additional ACF in tandem. Water depth is a function of grower preference and the species under cultivation. Upon continued pumping of air into sealed compartment 1 shown in FIG. 2c, the entire harvest membrane is raised resulting in displacement of culture water and organisms to the drainage end for harvesting, treatment or relocation.

FIGS. 3a–d are top views of the ACF illustrating gradual displacement and concentration of organisms towards the drainage end for collection, treatment or relocation. FIGS. 4a–e show the deflation process with exhaustion of sealed compartment 1 resulting in culture water-flooding of the culture chamber space.

Following the harvest cycle, pressure created from the refilling culture water deflates the pillow of sealed compartment 1 thus placing the ACF back into operation. Exposed harvest membrane 4 can be washed and solar sterilized before filling.

The ACF can be conformed to any shape, e.g. round, square, rectangular or elliptical, and can be used wherever water can be collected. The ACF is adaptable to existing aquaculture ponds and in ponds convertible to aquaculture. Most ponds that are over 7 feet wide are difficult to manually harvest. The shape and contour of the pond floor is less important when using the ACF. The ACF can also be used in steep terrain where a stair-step arrangement of a series of ACFs can be created to take full advantage of gravity, thereby reducing energy costs. This "water fall" use allows the culture of different species of organisms as water quality deteriorates from use.

In another embodiment, the device can be manufactured with multiple harvest layers which can be cut and removed thus exposing a new and clean harvest membrane, further reducing down-time. The additional layers can be part of the original manufacturing process or can be added in the field. Each additional harvest layer is a flexible membrane sealed at its edge portion with the GEO layer.

During the inflation or harvest cycle, the culture water can be pumped behind the harvest membrane for recycling back into the ACF system. Waste culture water can be drained off for irrigation and fertilization of adjacent crop land.

A provision can be made for the application of a net-like membrane which can be passed through the culture chamber. Smaller fish pass through the membranous net which acts as a grading device. Similar devices can be either attached or free floating on the culture water at the option of the operator.

The uniqueness of ACF technology allows for concentration of fish or other organisms at the drainage end of the culture chamber. By diverting water, wastes can be drained to one side and culture drained to the other. This is accomplished by forming a "Y" in the site preparation at the drainage end.

A series of ACFs can be configured and used to raise or lower organisms in a stair-step, tiered fashion creating a pneumatic fish lock or PFL. The need to move fish up or down-stream, as for example, at a dam site, is problematic. Existing methods of transportation of fish around dams with its multitude of complex environmental and regulatory problems can be resolved using the PFL embodiment of ACF technology.

Salmon fish are hatched in water above and up-stream of dams. The hatched fry are then brought down in barges and transferred to trucks that are driven around the dam followed by release of the fry below the dam. At the present time, it requires removing the fish from water for transport in holding tanks and then depositing at the desired location. Using these transportation techniques, the fish loss-rate is high and results unsatisfactory.

A PFL can be used to "raise" or "lower" fish by employing a series of ACFs, each culture chamber functioning as a fish lock, each lock at a different level. This is accomplished by placing each ACF unit parallel, in tandem or in any suitable arrangement depending upon the topography of the land. Adult fish or hatched fry can then be pneumatically pumped up or down stream in a series of ACF pneumatic fish locks. As water and organisms are displaced at the drainage end, they are deposited into either a higher or lower PFL. As the process is repeated from lock to lock, fish and water are finally deposited at the desired level, up or downstream, with virtually no injury to the fish.

A high velocity attractor venturi (AV) can be placed in a lake or stream adjacent to the PFL to attract fish to be moved. Fish slip around the nozzle of the venturi into the first containment stage of the PFL. The AV can be placed two on each side of the PFL, or as many as three to 24, or in any combination sufficient to generate flow to attract fish. The AV nozzles are placed to surround the opening of the first containment stage of the PFL. The AV effect attracts fry and smolts and is useful in the homeward migration of steelhead, salmon and other anadromous fish.

This embodiment has a variety of applications whenever it becomes necessary to transfer organisms to a different level. With ACF-PFL technology, fish can be raised or lowered by constructing a low-cost PFL around virtually any type of obstruction, natural or man made.

A PFL can be incorporated into new dam construction or retrofitted into existing dams. The PFL is a low cost structure for relocating fish that can be placed as needed and removed when necessary. The PFL can also be used to transfer fish from larval ponds to grow-out ponds at the same elevation or between ponds at differing levels. The capacity of membranes to withstand the rigors of the environment far exceed the biological requirements of the aquaculture.

In still another embodiment, ACF/PFL technology is applicable in low cost dredging of lake or river bottoms. A simple dredge is constructed using floating inlet/outlets. The same ACF/PFL combination is used to fill the culture chamber with bottom debris and sediments during dredging operations. When the culture chamber is filled with debris, it is displaced to a suitable container or area using the ACF pillow-displacing technology. The system is operated entirely with air pressure, reducing the need for a highly developed site or expensive equipment. The ACFPFL dredge is manufactured to specific dimensions and displacement, and is shipped as a roll.

The simplicity of the design of the PFL makes it unnecessary to have a sophisticated electrical system to run the air-charging device. Air in remote locations can be driven with a portable gas blower. PFL pump volume can be calculated using a simple formula. In a more sophisticated operation, air flow can be regulated through a system of computer controlled solenoids and valves.

ACF technology is applicable in areas other than aquaculture. Membrane technology is well adapted to the pumping and storage of many different chemicals and waste products under varying weather conditions and storage sites. ACF technology can be used to create a facility that can function as a chemical or waste storage unit with collection above or below ground for later transfer by pneumatic pump displacement to another site for final disposal.

In another ACF embodiment, two or three layered pneumatic bladders can be fitted to virtually any space that is used for cargo storage. These include harvesting debris or other organic waste products, liquid cargo such as sewage, paint, slurries, oil and related waste products that are collected in the cargo bed of a truck, rail car or ship. Any semi-fluid that is lighter then water can be easily displaced and moved using the inflated pillow of the ACF system of displacement.

Marine applications include pumping out of a cargo hold. By pumping sea water or air into the sealed compartment of the ACF, the cargo hold can be emptied of any fluid that is not corrosive to the membrane liners. Liners commonly used in landfills can be configured to form an ACF for use in the concentration and relocation of toxic waste products.

Other applications of ACF technology, for example, are in the treatment of waste water, solar distillation of grain products and as an evaporative concentrator. By using the positive pressure pumping technique of the ACF, materials that are the approximate weight of water, can be easily harvested or concentrated and then pumped into a container. It can also be used to drive off unwanted fluid for concentration into a heavier fluid.

Simple modifications of an ACF as a positive pressure membrane technique, make it applicable as a restraining device for sturgeon and other large fish as well as large animals including birds and ratites such as rhea, emu and ostrich. Through a modification of the ACF into another embodiment, it be can adapted to be used as a rapid immobilization device for human restraint.

Finally, although the invention has been described with reference of particular means, materials and embodiments, it is to be understood that the invention is not limited to the particulars disclosed and extends to all equivalents within the scope of the claims.

What is claimed is:

1. A process for displacement of water and aquatic organisms in a pond, said pond open at its top side, and having rigid bottom and side walls which form an interior surface of said pond, comprising the step of:

inflating a flexible liner comprised of two or more flexible membranes in sealing engagement at their edge portions and forming a sealed compartment, said flexible liner having an air inlet-outlet means through which air can be introduced to inflate and to exhaust air from said compartment, said inflated compartment displacing water and aquatic organisms to a drainage end, said flexible liner having at least one flexible membrane in contact with the rigid bottom and side walls of said pond, and being larger than the interior surface of said pond.

2. A pneumatic pump for displacement of water and aquatic organisms in a pond, said pond having rigid bottom and side walls which form an interior surface of the pond, comprising:

a. a flexible liner having the same contour as the pond in which the water and aquatic organisms are confined;

b. said flexible liner comprising two or more flexible membranes which are in sealing engagement at their edge portions and form a sealed compartment;

c. said flexible membrane having an inlet-outlet means through which air can be introduced to inflate said compartment and to exhaust air from said compartment;

d. said inflated compartment displaces said water and aquatic organisms in the pond to a drainage outlet; and e. said flexible liner having at least one flexible membrane in contact with the rigid bottom and side walls of said pond, and being larger then the interior surface of the pond.

3. An apparatus according to claim 2 wherein said aquatic organisms are fish or crustacea.

4. A pneumatic pump for displacement of water and aquatic organisms in a water-supported floating culture chamber, said chamber having flexible bottom and side walls which form an interior surface of said chamber, comprising:

a. a flexible liner having the same contour as said chamber in which water and aquatic organisms are confined;

b. said flexible liner comprising two or more flexible membranes which are in sealing engagement at their edge portions and form a sealed compartment;

c. said flexible membrane having an inlet-outlet means through which air can be introduced to inflate said compartment and to exhaust air from said compartment;

d. said inflated compartment displacing said water and aquatic organisms in said chamber to a drainage outlet; and e. said flexible liner having at least one flexible membrane in contact with said flexible bottom and side walls of said chamber, and being larger then the interior surface of said chamber.

5. An apparatus according to claim 4, wherein said aquatic organisms are fish or crustacea.

\* \* \* \* \*